DATA PROCESSING APPARATUS

Filed Dec. 11, 1963

INVENTORS
WILLIAM W. GARTH JR.
ELLIS P. HANSON
BY Weingarten, Orenbuch & Pandiscio
ATTORNEYS United States Patent Office 3,289,176

Patented Nov. 29, 1966

3,289,176

DATA PROCESSING APPARATUS

William W. Garth, Jr., Concord, and Ellis P. Hanson, Rockport, Mass., assignors to Compugraphic Corporation, Reading, Mass., a corporation of Massachusetts Filed Dec. 11, 1963, Ser. No. 329,712
5 Claims. (Cl. 340—172.5)

This invention relates in general to automatic typesetting systems, and more particularly to an apparatus which provides a display for semi-automatic hyphenation and in which deletions may be made before the information to be deleted has been entered onto an output medium for controlling a typesetting process.

The use of automatic typesetting equipment greatly increases the efficiency of the typesetting process. One such system is described in pending U.S. patent application 229,810, now forfeited. In a system described therein, the information to be typeset is keyboarded onto an input tape which is then supplied to a data processing system previously programmed with the desired line length for justification. This data processing system then generates an output tape for directly controlling a line casting machine. The system described is semi-automatic in that, when the end of a line occurs within a word, the operator makes the decision where to hyphenate. In order to make the hyphenation decision the entire word within which the line ending occurs must be displayed. In the specific embodiment illustrated in the above-cited patent this display is in the form of "hard copy," that is a previously generated typewritten copy of the text information forms the display with an indicator indicating the character which oversets the line length.

However, if the display is being generated from a tape or directly from the keyboard as the information is entered into the data processing unit, then some provision is required for generating a display of the entire word in which the character which oversets the line length occurs. This is necessary since to select the hyphenation point in a word the entire word must be known including that portion which occurs after the oversetting character.

Another problem in systems for automatically or semi-automatically controlling the typesetting process by keyboarding the information to be typeset into an output storage medium, is that of deleting material keyboarded in error. In the usual system, whenever an error is made, the keyboard operator must turn the output tape back to the place the error occurred and, when the tape is back at this point, depress a code "delete" key, punching holes in all code channels until the faulty codes are obliterated.

In the type of keyboard which produces "hard copy," that is, in which an auxiliary copy of the characters themselves is produced along with the perforated tape, the operator can count the number of characters back to the point of error, turn back the tape the appropriate number of steps, and then strike the "code delete" key. However, in recounting he must take into consideration any of the functional codes in his count. On keyboards which do not produce "hard copy" the operator must actually be able to read the perforated codes in the tape in order to locate errors made other than the last character struck. In this instance again, the functional key strokes, such as shift and unshift, return and elevate, complicate the problem of counting back to locate the errors.

Thus, the problem of locating an error and backing up on the tape to the point of error, and deleting this error and the following codes and retyping the correct text are time consuming and hence cause inefficiency in the typesetting process. In addition, more code deletes must be entered than are necessary to eliminate the error, since each character after the error must also be deleted by a separate operation.

One system which has been used to provide for error correction, makes error corrections at the end of each line. When the end of the line is reached, the operator strikes function keys to indicate the end of the line and, if he sees that an error has been made in that line, he further strikes a "line delete" key and then rekeyboards the entire line. The resultant tape contains the line with the error included, but it is then run through a transcribing typewriter or other data processing equipment equipped with two reading heads. When the tape passes through the first reader, any "line delete" code provides an output signal to the second reader so that at the second reader the entire line containing the error is omitted. However, such a system is complex, requires a dual reading head and requires retyping a large number of correctly keyboarded codes in relation to the number of incorrect codes.

It is, therefore, a primary object of the present invention to provide a typesetting apparatus or data processing equipment for typesetting in which a delete signal for deleting keyboard errors may be inserted as soon as the error is recognized and in which the erroneous material is not inserted in the output control storage medium and further in which the entire line ending word is displayed.

It is another object of this invention to provide an efficient typesetting apparatus which requires the typesetting process controller to have only one reading head and which requires only a single delete stroke by the keyboard operator.

Broadly speaking, the typesetting control apparatus of this invention includes an initial reader which converts the coded input tape or keyboarded information into electrical code signals. The signals from this reader are then applied to the input of a storage medium, typically a shift register. The output of the shift register is then provided to a data processing unit. A data processing unit suitable for use in the typesetting control device of this invention is described in pending U.S. patent application Serial No. 229,810, filed October 11, 1962. In the invention described in that application, the input tape from the keyboard is translated into electrical signals which are then provided to a data processing unit. The data processing unit which is constituted of a series of elements, accomplishes the function of justifying the output lines to a predetermined line length and coding an output tape with appropriate signals to control a typesetting machine to produce these justified lines.

In the present invention the shift register between the input reader and the data processing elements enables the apparatus both to delete information erroneously keyboarded before such information is entered on the output tape and also to display a contemporaneously generated image of the entire line ending word when the operator is required to make a hyphenation decision.

The display device receives the signals representing encoded characters from both this preliminary shift register and the data processing elements, thus it can display characters which follow the line oversetting character and which have not yet been acted upon by the data processing unit. This is necessary in order to display the entire word in which the oversetting character occurs. Without the entire word displayed the operator cannot make a proper hyphenation decision.

In order to delete errors, the keyboard operator depresses an "error correction" key whenever an error is made, thereby inserting a special code in the input tape following the word or part of a word which contains the error. Upon entry of this error correction code into the shift register, an operation is initiated which prevents the error correction code and all the information preceding this error correction code back to the last previous interword from entering into the data processing unit and in effect removes these codes from the shift register. The shift register then recommences normal operation on the characters following the error correction code and enters them into the data processing unit in proper sequence and order. In this system, the keyboard operator need only press an error correction key following his recognition of the keyboard error, and the system then proceeds to translate the keyboarded information automatically deleting that word or part of a word which contained the error; producing an output containing only the corrected version. If the output is a perforated tape, for example, the tape itself will contain no error.

Other objects and advantages will become apparent from the following detailed description when taken in conjunction with the accompanying drawings in which.

Figures 1, 2, 3:
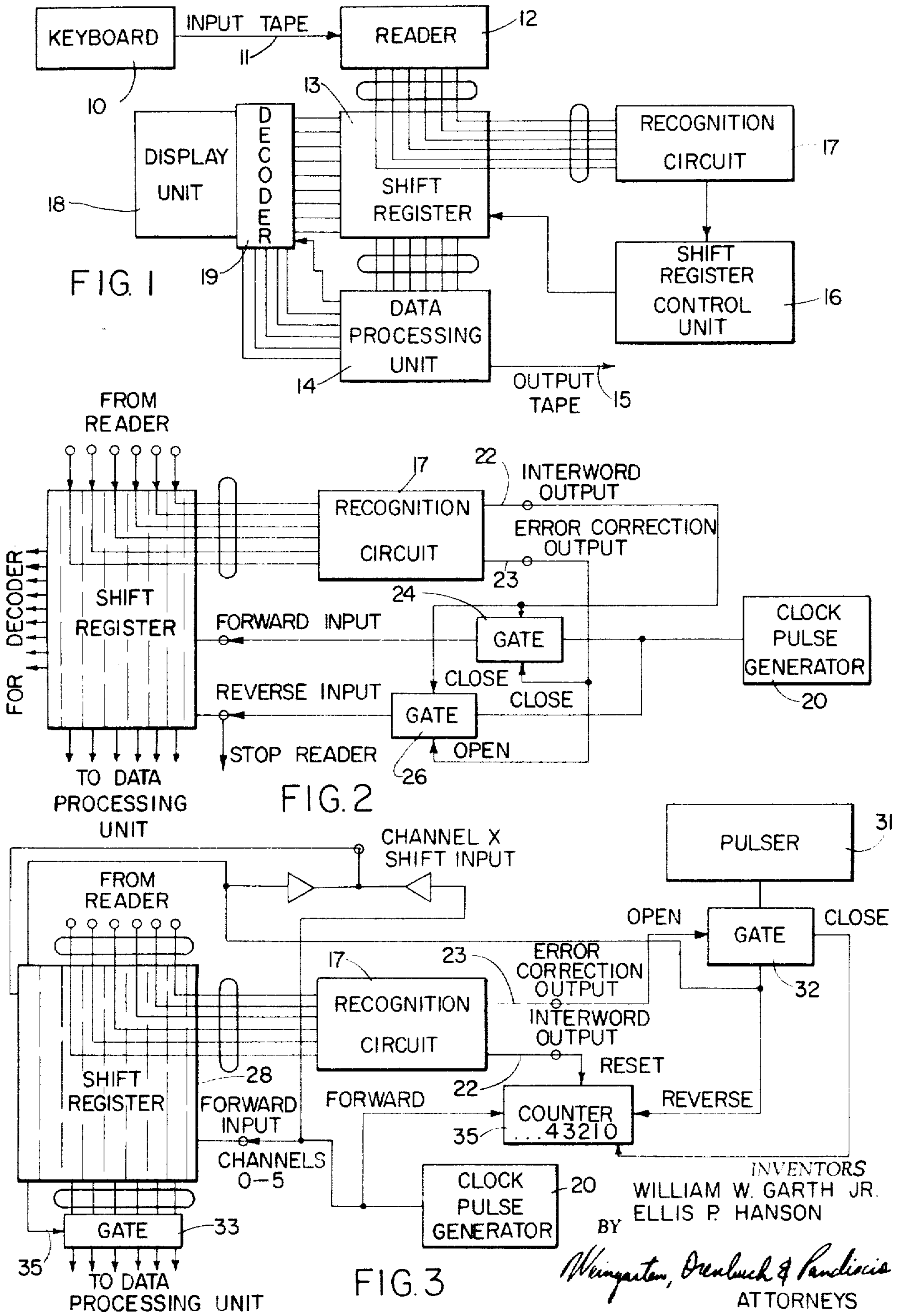
FIG. 1 is an illustration in block diagrammatic form of a data processing apparatus to produce output signals for controlling a typesetting process in accordance with the principles of this invention.
FIG. 2 is an illustration in block diagrammatic form of a shift register and associated circuits providing an error deletion device in accordance with the principles of this invention.
FIG. 3 is an illustration in block diagrammatic form of a shift register and associated circuits providing a second embodiment of an error deletion apparatus in accordance with the principles of this invention.

With reference now to the drawings, and more specifically to FIG. 1 thereof, the invention is shown as it might be incorporated in a practical system, for example, that shown in pending U.S. patent application Serial No. 229,-810, previously mentioned. Although the specific data processing system of this previous application forms no part of the present invention, it provides a convenient medium for illustration.

In the earlier data processing system, the information which was keyboarded was furnished on an output tape which could be utilized as the input to a line casting machine, or like printing equipment. Thus, in FIG. 1 there is shown a keyboard 10 upon which the operator types the information to be printed. Keyboard 10 produces an input tape 11, as shown in the drawing, which in turn serves as the input to reader unit 12. The input tape 11 contains sequential codes representing keys struck in the normal typewriting process, and the reader unit 12 provides, in turn, characteristic electrical signals which may be in six-bit parallel form. Thus, six parallel electrical channels are shown as the output of reader unit 12 and these serve as an input for shift register 13.

The parallel codes which pass through the shift register 13 are then coupled to the input of data processing unit 14, from which an output tape 15 is ultimately derived.

The shift register 13 is also coupled to a display unit 18 through a decorder unit 19. The display unit must be capable of displaying a clear image of the word in which the oversetting character occurs. A suitable device for a display of this nature is described in U.S. Patent No. 2,920,312. The decoding unit must provide input signals for the display device which will generate an image of the character which the code signals represent. The decoding unit is also coupled to the data processing unit 14 such that any information in storage in that unit is also provided to the decoder 19. The decoder 19 may be arranged to simultaneously read out each of the storage positions in the shift register 13 and in the data processing unit 14, or to scan these storage positions, and simultaneously display all the information read out in a single scan.

While this unit may be programmed to continuously display the characters it is preferred that the display be generated only when operator intervention is required to properly terminate a line. This latter type of operation can be arranged by providing an actuating signal to the decoder 19 from the data processing unit 14 whenever a semi-automatic line ending occurs. The decoder unit 19 may also be arranged to recognize interword codes thereby providing that the display unit show only a single word. The scanning function may be accomplished using any suitable technique such as a multiple position stepping switch.

If the data processing unit 14 is basically that shown in previously mentioned U.S. patent application Serial No. 229,810, output tape 15 may in one embodiment be a perforated tape for controlling a typesetting equipment, such as a line casting machine. For clarity, it is again pointed out that the specific operations of data processing unit 14 are not a part of the present invention; it has been included to demonstrate the manner in which keyboard 10 and the system immediately following may be used to produce an output tape or data codes in some other form for the control of a printing or typesetting process.

The shift register 13 itself is under the control of an element designated shift register control unit 16, and the latter is in turn under the control of a recognition circuit 17. The input to recognition circuit 17 is comprised of the same six channels which appear at the input to shift register 13. Stated otherwise, each six-bit parallel code, which in this embodiment is introduced to the shift register 13 by reader 12, is also simultaneously impressed upon the input of recognition circuit 17. At all times then, the input to recognition circuit 17 will consist of the codes which reside in the first storage position of shift register 13.

In normal operation, the operator keyboards the information on keyboard 10, which perforates or otherwise codes the input tape 11. Input tape 11 is in turn fed to the reader 12 which translates the codes on the input tape into a six-bit electrical output which is provided to shift register 13. The shift register 13 may be any of the conventional designs for apparatus of this type, and as such is operated, in general, by a repetitive clock pulse. One limitation, however, is that shift register 13 must have the capability of shifting codes either in the forward or reverse directions.

Shift register 13 must have a serial storage capacity which exceeds the maximum number of coded character signals which generally may be expected to occur between interword signals, both, as will be described below in order to allow for error deletion and also, as described above, to provide for display of an entire word. It is impractical for the shift register to have a storage capacity exceeding the number of characters in the longest word in the language being used. In practice the capacity may be less than this. The capacity should be enough to include all but the unusually long words. Thus, a capacity of 12 characters includes 99% of words appearing in the usual text. Words with more characters have to be treated manually. As the electrical signals from the reader 12 are applied to the input of shift register 13, the shift register control unit 16 operates the shift register to shift the information in a step-by-step manner through storage and to the output of the shift register, the latter being coupled to the data processing unit 14. The data processing unit than acts upon the input information in accordance with its predetermined program, as noted earlier, to produce an output such as tape 15 suitable for directly controlling a typesetting process.

In normal operation of the system the input tape is read character-by-character and word-by-word in reader 12, and each of the alpha-numeric characters, punctuation marks, interword spacing codes, and the like, are applied to the input of shift register 13. Each input code shifts all preceding codes serially through the shift register, without alteration of character, until the serial positions of the shift register 13 are entirely full. Thereafter, as each new code is applied to the shift register input, the code in the last shift register storage position appears as an an input to data processing unit 14. If the typing at the keyboard were errorless, then all of the input information would pass through to the data processing unit, except for a time delay equal to the time for serial, forward passage through the storage capacity of shift register 13.

When, however, the keyboard operator makes a keyboard error, which he does not wish to have appear as an input to data processing unit 14 and hence on output tape 15, he presses an "error correction" key which provides a distinctive error correction code signal in input tape 11. This may be any one of the independent six-bit electrical codes, and when this electrical signal or "error correction" code is transmitted from reader 12 to the input of shift register 13, the recognition circuit 17 simultaneously responds and provides a signal to shift register control unit 16.

Shift register control unit 16, which will be described in more detail below, operates the shift register 13 in such a fashion that the error signal as well as all previous codes up to the last preceding interword are removed from the shift register and not transferred into the data processing unit 14. The keyboard operator then proceeds to rekeyboard either that word or part of a word which contained the error, and thereafter, continues the normal typing process. This system may be made to operate at high speed and the entire deletion process takes place in the time between the reading of two sequential codes from the input tape 11. Thus, upon recognition by the operator that an error has been made, he can merely depress the error key and then immediately proceed retyping the word which contained the error.

In FIGS. 2 and 3, two separate embodiments of shift registers and control circuits for deleting the erroneous codes from the shift register are illustrated in detail. With reference now to FIG. 2, a shift register 18 is shown as typically having six individual parallel channels, and it should be understood that each channel has a serial storage capacity which exceeds the maximum number of bits which would occur between two interword codes. As in FIG. 1, each of the storage positions are connected to the display decoder unit.

The shift register 18 is of the reversible type, that is, clock pulses applied at one input cause the shift register to shift in a forward direction while clock pulses applied at another input cause the shift register to shift in the reverse direction.

A recognition circuit 17 is connected in parallel with the first storage position in each of the channels of the shift register 18. The recognition circuit would typically be a tree circuit which provides individual output leads for selected code inputs. Thus, when the selected codes are received the corresponding individual output lead is actuated. Recognition circuit 17 is arranged to provide two individual outputs, one such output being provided when the code received by the recognition circuit 17 from the shift register 18 represents any interword code, with the other output being actuated whenever the recognition circuit 17 receives a code from shift register 18 representing the error correction signal code. The output terminal 22 on recognition circuit 17 is actuated when an interword code is received at the input of recognition circuit 17 and the output terminal 23 is actuated when an error correction code is received at the input of recognition circuit 17.

Interword output terminal 22 is connected to a bistable gate 24 and provides an "open" signal to that gate. The bistable gate 24 couples the clock pulse generator 20 and to the forward shifting input of shift register 18. In its open position, gate 24 permits the clock pulses from the clock pulse generator 20 to drive the shift register 18 in a forward direction, while in its closed position pulses from clock pulse generator 20 are inhibited from reaching the forward driving input to shift register 13.

The "close" signal for gate 24 is provided from the recognition circuit "error correction" output terminal 23. A second bistable gate 26 couples the clock pulse generator to the reverse driving input of shift register 18 which in its open position transmits pulses from the clock pulse generator 20 to drive shift register 18 in the reverse direction, while in the closed position gate 26 inhibits passage of pulses from the clock pulse generator 20 to the reverse driving input. Gate 26 receives its "open" input control signal from the error correction output 23 of recognition circuit 17 while it receives its "closed" control signal from the interword output terminal 22 of recognition circuit 17.

In operation, whenever the apparatus of FIG. 2 receives an error correction signal at the input of shift register 18, the shift register commences to shift in reverse and continues to do so until the next previously inserted interword code arrives at the initial storage position of the shift register 18. In the process of reverse shifting the positions at the output end of the shift register, from which codes are now shifted towards the input, are left blank. When the latter interword code does arrive at the initial storage position, the action of the shift register is again changed to resume shifting in the forward direction. The result then is that when the operator depresses the error correction key, all codes previously inserted into shift register 18 up to the last preceding interword are removed from the shift register which then continues processing in the forward direction codes which have been keyboarded after the error correction has been keyboarded.

In FIG. 3 a second embodiment of a shift register and control apparatus suitable for inserting between the reader 12 and data processing unit 14 of the typesetting control system illustrated in FIG. 1, is shown. The shift register 28 in this embodiment need not be of the reversible type, that is, able to shift in both forward and reverse directions. However, the shift register 28 of this embodiment has, in addition to the six code channels, an additional channel which receives its input from a pulser 31 through a bistable gate 32. Each of the storage positions in the six code signal channels of shift register 28 are connected to the display decoder unit. The output from the six code signal channels of shift register 28 is also coupled to the data processing system through a normally open gate 33. The normally open gate 33 has an additional control input 35, which when actuated closes gate 33 inhibiting the passage through it of signals from the six code signal channel of shift register 28. The signal from the control input 35 of gate 33 is provided from the additional channel of the shift register 28.

The operation is such that when a bit is located in the extra channel in parallel with a code in the six signal channels, the code from the six signal channels is therefore not allowed to pass through to the data processing system 14 (as in FIG. 1). The recognition unit 17 in the embodiment of FIG. 3 has the same characteristics and functions in the same manner as that described above with reference to FIG. 2. However, in the embodiment of FIG. 3 the error correction terminal 23 is connected to bistable gate 32 and actuation of this output terminal provides an open signal to gate 32. The interword output terminal 22 from recognition unit 17 is connected to provide a "reset" signal to a forward-backward counter 35. Forward-backward counter 35 is a conventional reversible digital counter which receives its forward driving input from clock pulse generator 20. For each pulse from the clock pulse generator 20, the counter 35 advances one unit in the forward direction. Pulses from pulser 31 transmitted through gate 32 are provided to the reverse counting input of counter 35 and for each pulse received on this input, the count in counter 35 is moved backward one unit. The forward capacity of counter 35 must equal the serial storage capacity of an individual channel in the shift register 28. In the reverse direction, the limit is the zero position of the counter 35. Thus, if the counter is in the zero position and receives a subtracting pulse on the reverse input, the count in the counter 35 remains at zero. When the interword output terminal 22 of the recognition unit 17 is actuated, it provides a reset pulse to counter 35 which resets the count in that counter to the zero position. The counter 35 provides a closed signal to gate 32 whenever the count position changes from the one to the zero state.

In operation then, the above-described apparatus normally processes code signals from the reader through the shift register 28 and through the open gate 33 to the data processing system. For each shift in the shift register the clock pulse generator 20 provides a pulse which is counted in the forward direction in counter 35, however, counter 35 is reset to zero each time an interword code signal is received at the input of shift register 28 and hence at the recognition unit 17. Under these conditions, the keyboard information is transferred through the shift register to the data processing system. However, if the keyboard operator makes an error and wishes to correct it, he strikes the error correction key which provides an error correction signal to the input of shift register 28. When shift register 28 receives the error correction code signal, it is also received at recognition unit 17, which then actuates the error correction output 23. Actuation of error correction output 23 provides an open signal to gate 32 allowing pulses from pulser 31 to be passed to both the non-code signal channel in shift register 28 and to the reverse input of counter 35. The pulses provided to the non-code signal channel of shift register 28 are also provided to a shifting input of this channel so that as each pulse is entered it is shifted forward into the next storage position of the shift register. Pulses continue to be fed to the input of this shift register channel and to the reverse input of counter 35 until the count in counter 35 is reduced to zero, at which time, a close signal is provided to gate 32, thus inhibiting the flow of any further pulses to either the counter 35 or the non-code signal channel in shift register 28. Pulser 31 is operated at a pulse frequency such that the entire operation of providing pulses to the non-code signal channel in shift register 28 takes place in a time much less than the separation time between two pulses from the clock pulse generator 20.

At the next clock pulse from generator 20, the shift register code signal channels and also the non-code signal channels are shifted forward. However, for each storage position in the non-signal code channel which contains a bit introduced by the entry of a pulse from pulser 31, when the code signal stored in parallel is shifted out of the shift register a close signal is provided on control input 35 of gate 33. This close signal inhibits the passage of information from the code signal channels which occupy a parallel storage position. The effect of this operation is that upon entry of an error correction signal pulser 31 provides pulses to the non-signal code channel in shift register 28 equal to the number of codes which have been entered before the error correction signal and since the last previous, interword. Thus, each of these codes are inhibited from passing to the data processing system. Accordingly, the apparatus automatically, upon striking of the error correction signal, deletes from processing into the typesetting operation itself all entries up to the last previous interword. The operation may be arranged so that the last previous interword as also deleted. If the circuitry is arranged in this manner, then two "delete" codes in succession would remove two words provided that all of the characters are within the storage device.

While the invention has been described in terms of specific logic elements and with reference to a specific data processing unit, it should not be limited to these specific elements, rather than the invention herein should be construed as limited only by the spirit and scope of the appended claims.

What is claimed is:

1. Typesetting control apparatus for a producing a series of output signals for controlling a typesetting machine to produce lines justified within a predetermined line length from information keyboarded in word and paragraph form, which may include erroneously keyboarded information followed by error correction signals, comprising: a sensing device responsive to said keyboarded information for providing electrical signals representing said information; a storage medium coupled to the output of said sensing device, said storage medium including a plurality of storage positions, means for normally processing signals from the input of said storage medium in a particular sequence through said storage positions to the output of said storage medium; a data processing unit coupled to the output of said storage medium for generating in response to signals from the output of said storage medium control signals for controlling a typesetting machine to produce lines justified within a predetermined line length; a display means for displaying any one of the said words within which any one of said justified lines is terminated, said display means being coupled to said storage medium and said data processing unit in such a way that information contained in said storage medium and said data processing unit is available to said display means; a recognition element coupled to said reader and adapted to receive said electrical signals in parallel with said storage medium; means with said recognition element responsive to said error correction signal for deleting from said storage medium all of said electrical signals preceding said error correction signal, which signals are contained within a single word or a portion of a word.

2. Typesetting control apparatus for producing a series of output code signals for controlling a linecasting machine to reproduce information in lines justified within a predetermined line length from a series of input code signals followed by error correction code signals, comwhich includes character signals for forming said words and interword signals for indicating the beginning and end of said words and which may include erroneous code signal followed by error correction code signals, comprising: a shift register storage unit; a signal recognition circuit; means for applying said input code signals in parallel to the input of said shift register and said recognition circuit; means for normally and forwardly advancing said applied input code signals sequentially through said shift register to the output thereof; means in said recognition circuit for responding to each of said error correction code signals to reverse the action of said shift register and thereby reverse the flow of input code signals stored therein; means in said recognition circuit for responding to code signals at the input of said shift register during said reverse flow and to terminate said reverse flow and reinstitute said normal forward advance of said applied input code signals upon receipt of the next succeeding interword signal; data processing apparatus coupled to the output of said shift register for generating a sequence of output signals representing the information contained in said code signals arriving at the output of said shift register together with justification signals for controlling a linecasting machine to produce said information in lines justified within a predetermined line length; and a display means for displaying each one of said words within which one of said justified lines must terminate said display unit being coupled to said shift register and to said data processing apparatus.

3. Typesetting control apparatus for producing an output tape for controlling a typesetting machine to reproduce information in lines justified within a predetermined line length from an input tape containing code signals representing said information in word and paragraph form and which may include erroneous code signals followed by error correction code signals, comprising: a reader responsive to said input tape signals for providing electrical signals representing said codes on said input tape; a storage medium coupled to the output of said reader, said storage medium including a plurality of storage positions; means for normally processing signals from the input of said storage medium sequentially through said storage positions to the output of said storage medium; a data processing unit coupled to the output of said storage medium and receiving signals processed through the output of said storage medium, said data processing unit generating an output tape containing said information contained on said input tape exclusive of said erroneous codes and including justification signals for controlling a typesetting machine to produce said information in lines justified within a predetermined line length; a display means for displaying any one of said words within which one of said justified lines is terminated; a code recognition element coupled to said reader and adapted to receive said electrical signal in parallel with said storage medium; means in said code recognition element responsive to said error correction code signals for deleting from said storage medium all of said electrical signals immediately preceding said error correction signal and contained within a single word or portion of a word.

4. Apparatus in accordance with claim 3 wherein said storage medium and said data processing apparatus are coupled to said display means to provide all of the information contained in said storage medium and said data processing apparatus to said display means.

5. Typesetting control apparatus for producing a series of output signals for controlling a linecasting machine to produce lines justified within a predetermined line length from information keyboarded in word and paragraph form, which may include erroneously keyboarded information followed by error correction signals, comprising: a sensing device responsive to said keyboarded information for providing electrical signals representing said information; a storage medium coupled to the output of said reader, said storage medium including a plurality of storage positions, means for normally processing signals from the input of said storage medium in a particular sequence through said storage positions to the output of said storage medium; a data processing unit coupled to the output of said storage medium for generating in response to signals from the output of said storage medium control signals for controlling a linecasting machine to produce lines justified within a predetermined line length; a code recognition element coupled to said sensing device and adapted to receive said electrical signals in parallel with said storage medium; means within said code recognition element responsive to said error correction signal for deleting from said storage medium all of said electrical signals immediately preceding said error correction signal, which signals are contained within a single word or a portion of a word.

No references cited.

ROBERT C. BAILEY, *Primary Examiner.*

P. J. HENON, *Assistant Examiner.*